Oct. 24, 1933. C. M. GERHOLD Re. 18,980

SMOKE WASHING APPARATUS

Original Filed Aug. 9, 1929

Inventor
CHARLES M. GERHOLD

By his Attorney
Clarence S. Ashley

Reissued Oct. 24, 1933

Re. 18,980

UNITED STATES PATENT OFFICE 18,980

SMOKE WASHING APPARATUS

Charles M. Gerhold, New York, N. Y.

Original No. 1,757,522, dated May 6, 1930, Serial No. 384,730, August 9, 1932. Application for reissue May 5, 1932. Serial No. 609,543

8 Claims. (Cl. 183—8)

The invention relates to improvements in smoke washing apparatus applicable to any of the known types of chimney structure and particularly serviceable as a means of entirely eliminating soot, ashes, debris, and other objectionable particles from the smoke emanating from chimney stacks and other exhaust ducts of a like nature.

The invention comprises supporting means at and upon the exhaust end of the chimney or other like structure and of the attachment thereto of a trough or water reservoir having mounted thereon means supporting an accumulator hood or dome carrying a suitable baffle means arranged to pocket an amount of the gases emanating from the chimney to form a cushion or buffet body for the smoke, gases, etc., passing therefrom, and upon which cushion said smoke, gases, etc. impinge and are deflected through a water curtain or screen formed by a water supply disposed in said dome, thus washing and clarifying said smoke and gases and precipitating deleterious substances therefrom, to the trough or reclamation means whence it is returned through suitable drainage means to any point of deposit, permitting only the substantially clarified and purified vapors to emit from the stack.

An object of the invention resides in the superimposing upon the emitting end of a chimney or stack of a specially formed deflector hood provided with a baffle wall arranged to accumulate an amount of gas to act as a buffer cushion against which the smoke contacts and from which the smoke and gases are deflected through the water curtain, thoroughly washing said smoke and precipitating all solids to the reclamation trough whence same may be carried off through suitable gravity exhaust means, the action of the smoke and gases passing from such chimney or stack functioning as a draft or vacuum head for the generator unit.

In the following there is described one embodiment of the invention, the features thereof being more clearly defined hereinafter in the claims.

In the drawing, Fig. 1 is a vertical sectional view of the smoke washing apparatus as applied to the emitting end of any of the known types of chimney or stack ends;

In the following similar numerals of references indicate similar parts throughout the drawing, forming part hereof.

Figure 1:
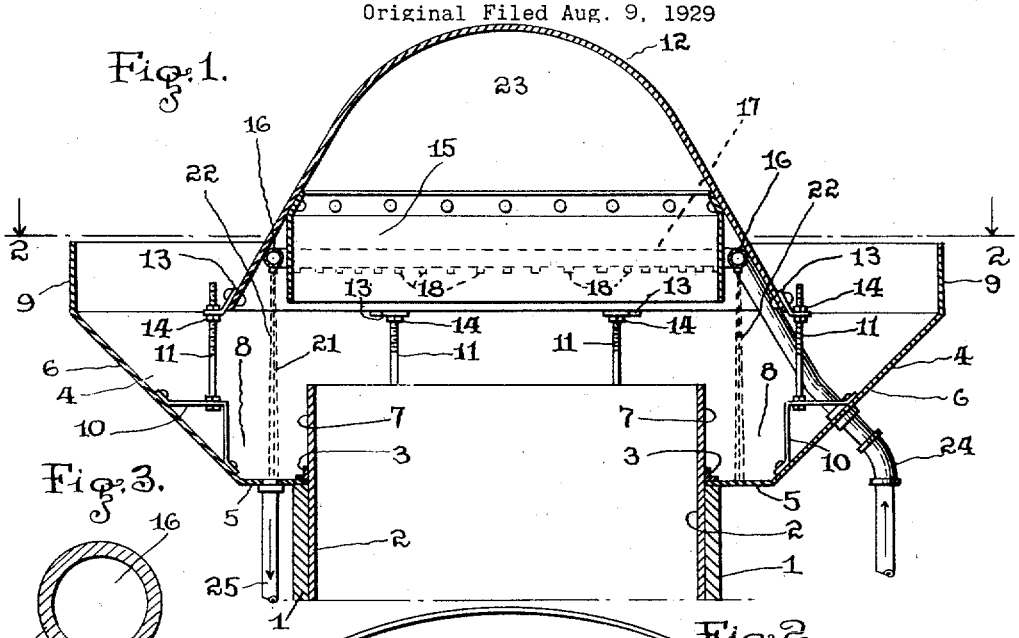
Figure 3:
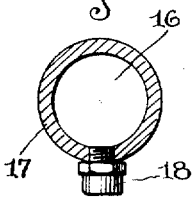
Fig. 3 is a cross sectional view of the water head showing the position thereon of a water ejector nozzle or nipple.
Figure 2:
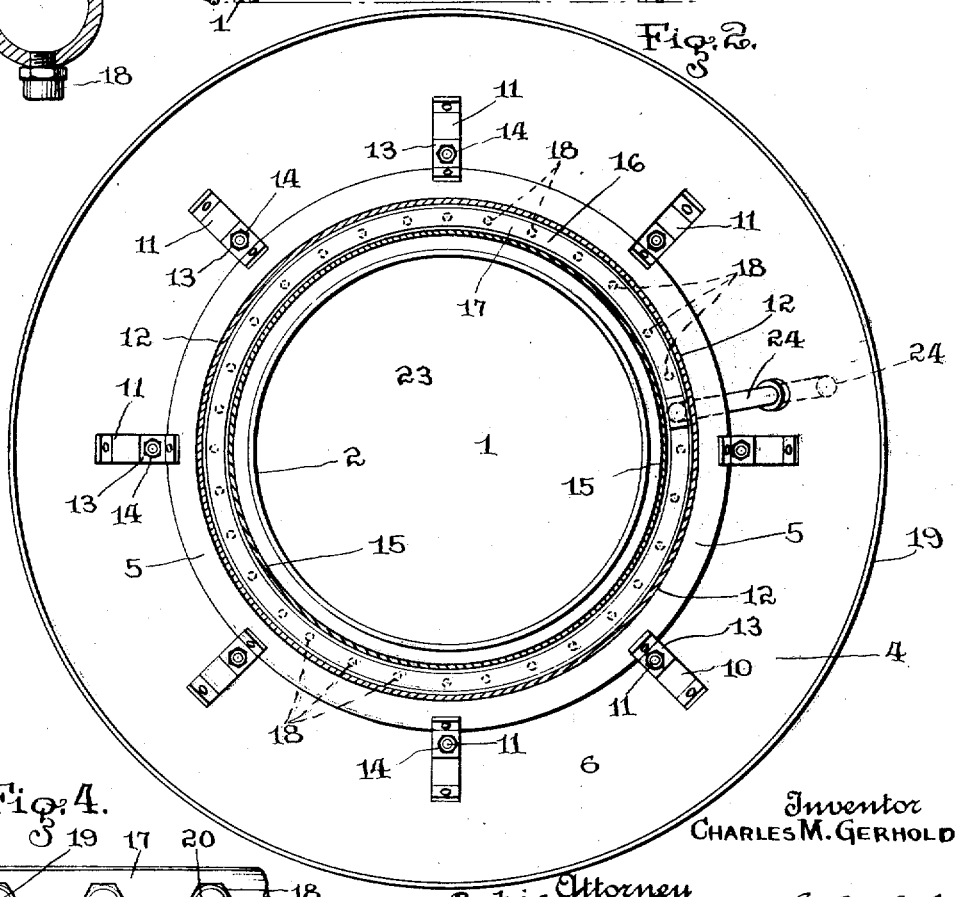
Fig. 2 is a plan cross section on the line 2—2 of Fig. 1 of the accumulator trough showing in cross section the deflector head and the water ejector means for forming the clarifying water curtain.
Figure 4:
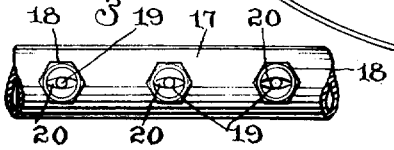
Fig. 4 is an under elevation of the water head showing the position therein of the ejector nozzles and of the specific formation of the water ducts or apertures for casting a fan like stream to form the water curtain or washing means.

In the drawing 1 designates a chimney or stack structure having disposed upon its exhaust or emitting end a secondary chimney structure comprising a supporting collar or structure comprising a supporting collar or sleeve 2, carrying an annular rib 3 to which an accumulator or reception trough 4 is attached, said trough 4 receiving part of its support upon the rim or top of said exhaust structure 1.

Trough 4 is a partly frustra-conical form inverted and provided at its lower portions with a horizontal section 5 to form between the conical wall 6 and the outer surface 7 of supporting sleeve 2, a water or reclamation chamber 8, and at the top of said conical wall 6 a circular sleeve 9 forming the exhaust or emitting end of the stack 1. Wall 6 of trough 4 has mounted thereon a series of supporting brackets 10 having disposed therein bolts 11 which have mounted thereon and adjustable vertically with relation thereto a cone-like accumulator hood or dome 12. The peripheral edge of dome 12 has mounted thereon clips 13 engaging said bolts 11 the same being adjustably secured thereon by means of nuts 14.

Said dome or hood 12 has mounted on its under side and within the conical confines thereof a baffle sleeve or annular plate 15 arranged to form the means of accumulating of gas from the stack to form the smoke cushion or buffer deflector means. A water head, 16, is mounted within said dome on the outside of said baffle sleeve 15 immediately above the trough section 5 of the accumulator and consists of a coiled pipe 17 having mounted therein a plurality of nipples 18 each provided with apertures 19 merging with elliptical vents 20 for spray forming means arranged to deflect a water spray of fan like formation 21 between each nipple to thus form a complete circular or annular water curtain around the main vent or passageway 22 between the exhaust end of stack 1 and atmosphere, providing therefor a washing means through which every particle of smoke, gas, heavier than air particles, etc., from stack 1 must pass to be completely clarified.

It will be seen from the drawing that the baffle 15 extends to a considerable distance below the nipples or spray nozzles 18. It will therefore be obvious that the gases are deflected downwardly so they cannot pass through the spaces between the upper portions of the fan shaped sprays adjacent the nozzles but can pass only through the portions of the sprays below the level where their edges come together. Therefore none of the gases can by-pass through the spaces adjacent the nozzles where there is no spray but must all pass through a continuous unbroken curtain of spray which is under pressure and has sufficient force to completely carry out the solid particles of dust, soot and so forth in the gases, and also absorb the soluble gases. It will be evident that with this arrangement all the gases and solids come in contact with the liquid giving maximum washing effect. Still further as the gases are deflected downwardly under the baffle 15 they flow somewhat in the general direction of flow of the liquid spray curtain and therefore the force of the spray curtain increases the speed of flow of the gases and increases the draft in the stack. As the gases pass out of the spray curtain they flow in a curved path outwardly and upwardly under the lower edge of the dome 12. This sudden change of direction causes centrifugal action to force the water and solid particles down into the lower part of the trough 4 insuring a more complete separation of the liquid and solids from the gases and preventing the spray being carried out into the atmosphere by these gases.

Within dome 12 and above baffle sleeve 15 a gas chamber 23 is formed to receive the gases, etc., from stack 1.

Water head 16 is connected with a fresh water supply pipe 24 connected with any source of water supply, and section 5 of accumulator 4 has mounted therein an exhaust or waste pipe 25 arranged to carry off by gravity the sludge and other substances washed from the smoke, gases etc., emitted by the chimney or stack.

The invention may be varied in structural form in many ways without departing from the spirit of the same as is shown, described and claimed herein.

What is claimed and desired to secure by Letters Patent of the United States is:

1. A device of the character described comprising an auxiliary supporting means disposed upon a chimney outlet, a reservoir mounted thereon, a receiving chamber formed in said reservoir between the outer wall of said stack and the inner wall of said reservoir, supporting means, a hood disposed upon the supporting means in said reservoir, an annular vertically disposed baffle means mounted in said hood arranged to form within the conical dome thereof a gas cushioning chamber, a water head mounted in said hood on the outer wall of said baffle means provided with a plurality of nipples having apertures adapted to project a fan like spray across the vent between said reservoir and hood to form a water curtain for clarifying the smoke and gases emitted by said chimney.

2. A device of the character described comprising a partly conically shaped reservoir mounted on the exhaust end of a smoke stack; a water and sludge receiving chamber formed in said reservoir, supporting means, an accumulator hood mounted on said supporting means, and annular baffle means mounted in said hood and depending therein to form within said hood a gas cushioning chamber, a water head mounted in said hood and disposed around the outside of said baffle means provided with a plurality of spray nipples arranged to project an uninterrupted water curtain across the vent between said reservoir and the peripheral edge of said hood, a water supply pipe connecting said water head with a water supply source, and a pipe connection to the chamber of said reservoir arranged to carry off the sludge precipitated therein from the washing of the smoke from said stack.

3. A device of the character described comprising an inverted conically shaped reservoir mounted on the emitting end of a chimney, a sludge receiving chamber in said reservoir, supporting means, an accumulator hood mounted on said means in spaced relation to the exhaust end of said chimney, an annular baffle sleeve mounted in the dome of said hood, a water head mounted in said hood and disposed around the outer wall of said baffle sleeve adapted to project a water curtain across the vent between said reservoir and hood to the chamber in said reservoir, a plurality of nipples mounted in said water head provided with emitting apertures arranged to project said water curtain in an annular uninterrupted column circumferentially around the exhaust end of said chimney to clarify the smoke passing through said vent, a pipe connection forming means for supplying water to said water head, and an exhaust pipe connection to said reservoir in the receiving chamber thereof arranged to carry off the sludge precipitated therein.

4. A device of the character described comprising a receiving chamber disposed about a chimney outlet, a hood disposed over said outlet and of greater diameter than the outlet to overhang the sides thereof, an annular upright baffle mounted at the underside of the hood and spaced above the stack, a water head having a plurality of nozzles provided with apertures adapted to provide a fan like spray into said chamber across the space between the baffle and the walls of the chamber for clarifying the smoke and gases emitted by the chimney, said nozzles being located outwardly of the baffle and spaced above its lower edge so as to form a continuous curtain of spray through which the gases pass.

5. A device of the character described comprising a receiving chamber disposed about a chimney outlet, a hood disposed over said outlet and of greater diameter that the outlet to overhang the sides thereof, an annular upright baffle mounted at the underside of the hood outwardly of the outlet and spaced above the stack, a water head having a plurality of nozzles between the baffle and the lower end of the hood, said nozzles being spaced above the lower edge of the baffle and directed downwardly into said chamber to form a curtain of spray through which the gases pass, and said chamber having walls surrounding and extending above the lower edge of the hood in spaced relation thereto to deflect the gases upwardly about said hood.

6. A device of the character described comprising a partly conically shaped structure surrounding the outlet end of a smoke stack and forming a water and sludge receiving chamber about said outlet, a hood spaced vertically above the stack and of greater diameter than the stack, an annular baffle means mounted in the hood and depending therefrom to form a gas chamber within the hood, a water head mounted in the hood and disposed around the outside of said baffle means provided with a plurality of spray nipples arranged to project an uninterrupted water curtain across the vent between the walls of said chamber and the peripheral edge of said hood, a supply pipe connected to said head, and a conduit for carrying off the sludge precipitated in said chamber.

7. A device of the character described comprising an inverted conically shaped wall mounted to embrace the outlet of a smoke stack and forming a sludge receiving chamber, a hood mounted in spaced relation above said outlet forming a vent between the edges of the hood and said wall, an annular upright baffle sleeve mounted in said hood, a water head disposed around the outer wall of said baffle sleeve adapted to project a water curtain into said chamber across the vent between said hood and wall, a plurality of nipples mounted in said water head provided with emitting apertures arranged to project said water curtain in an annular uninterrupted curtain circumferentially around the outlet end of said stack to clarify the gases passing through the vent, means for supplying water to said head, and conduit means for conducting the sludge from the chamber.

8. A device of the character described comprising a series of downwardly directed aligned nozzles providing a series of flat jets, said nozzles being so spaced that the adjacent jets come together to form a continuous curtain of the spray, means for feeding liquid to said nozzles under pressure to produce a downwardly directed continuous curtain of a forced liquid spray, and means for directing gases laterally through this curtain.

CHARLES M. GERHOLD.